United States Patent
Liu et al.

(10) Patent No.: US 10,528,176 B2
(45) Date of Patent: Jan. 7, 2020

(54) TOUCH DISPLAY PANEL WITH NEAR FIELD COMMUNICATION ANTENNA CIRCUIT

(71) Applicant: BOE TECHNOLOGY GROUP CO., LTD., Beijing (CN)

(72) Inventors: Haodi Liu, Beijing (CN); Hongna Ye, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 230 days.

(21) Appl. No.: 15/328,761

(22) PCT Filed: Jul. 8, 2016

(86) PCT No.: PCT/CN2016/089403
§ 371 (c)(1),
(2) Date: Jan. 24, 2017

(87) PCT Pub. No.: WO2017/063403
PCT Pub. Date: Apr. 20, 2017

(65) Prior Publication Data
US 2017/0262120 A1     Sep. 14, 2017

(30) Foreign Application Priority Data

Oct. 13, 2015   (CN) .......................... 2015 1 0670760

(51) Int. Cl.
*G06F 3/041*   (2006.01)
*G06F 3/044*   (2006.01)
*H04B 5/00*    (2006.01)

(52) U.S. Cl.
CPC ............ *G06F 3/0416* (2013.01); *G06F 3/044* (2013.01); *G06F 3/0412* (2013.01); *H04B 5/0087* (2013.01); *G06F 2203/04103* (2013.01)

(58) Field of Classification Search
CPC ...... G06F 3/041; G06F 3/0412; G06F 3/0414; G06F 3/0416; G06F 3/044; G06F 3/045;
(Continued)

(56) References Cited

U.S. PATENT DOCUMENTS

2002/0036621 A1*  3/2002  Liu ..................... G06F 3/03545
                                                         345/173
2009/0167699 A1*  7/2009  Rosenblatt .............. G06F 3/044
                                                         345/173
(Continued)

FOREIGN PATENT DOCUMENTS

CN     102479995 A    5/2012
CN     103677398 A    3/2014
(Continued)

OTHER PUBLICATIONS

Search Report and Written Opinion dated Oct. 10, 2016 from State Intellectual Property Office of the P.R. China.
First Chinese Office Action dated Aug. 2, 2017.

*Primary Examiner* — Amit Chatly
*Assistant Examiner* — Nelson Lam
(74) *Attorney, Agent, or Firm* — Dilworth & Baresse, LLP.; Michael J. Mussela, Esq.

(57) ABSTRACT

A touch display panel, a manufacturing method thereof, a driving method thereof and a display device. The touch display panel includes: a display region which is provided with a touch circuit; and a non-display region which is provided with a near field communication (NFC) antenna circuit and a control circuit. The NFC antenna circuit includes at least one coil, a first connecting line connected with one end of the coil, and a second connecting line connected with another end of the coil; and the first connecting line and the second connecting line are connected with the control circuit, and the first connecting line and the
(Continued)

second connecting line are connected or disconnected with each other under the control of the control circuit.

15 Claims, 7 Drawing Sheets

(58) Field of Classification Search
CPC .................... G06F 3/046; G06F 3/047; G06F 2203/04104; H04B 5/0081
USPC .................................................. 345/173–179
See application file for complete search history.

(56) References Cited

U.S. PATENT DOCUMENTS

| | | | | |
|---|---|---|---|---|
| 2011/0273382 | A1* | 11/2011 | Yoo | G06F 3/041 345/173 |
| 2013/0241864 | A1* | 9/2013 | Chen | G06F 3/0418 345/174 |
| 2014/0028619 | A1* | 1/2014 | Huang | H04B 1/3827 345/174 |
| 2014/0043248 | A1* | 2/2014 | Yeh | H01Q 7/00 345/173 |
| 2014/0078094 | A1* | 3/2014 | Yang | G06F 3/0418 345/174 |
| 2014/0087658 | A1* | 3/2014 | Hou | G06F 3/041 455/41.1 |
| 2014/0145982 | A1* | 5/2014 | Peng | G06F 3/0416 345/173 |
| 2014/0285468 | A1* | 9/2014 | Liao | G06F 3/044 345/174 |
| 2014/0362038 | A1* | 12/2014 | Murakami | G06F 3/0416 345/174 |
| 2016/0026276 | A1* | 1/2016 | Lu | G06F 3/046 345/173 |
| 2016/0365620 | A1* | 12/2016 | Que | H01Q 1/243 |
| 2017/0351355 | A1* | 12/2017 | Hsieh | G06F 3/041 |
| 2017/0371491 | A1* | 12/2017 | Horikoshi | G06F 3/03547 |
| 2019/0036208 | A1* | 1/2019 | Yamagishi | G06F 3/046 |

FOREIGN PATENT DOCUMENTS

| | | |
|---|---|---|
| CN | 104536628 A | 4/2015 |
| CN | 105224136 A | 1/2016 |
| CN | 204965386 U | 1/2016 |

* cited by examiner

TOUCH DISPLAY PANEL WITH NEAR FIELD COMMUNICATION ANTENNA CIRCUIT

TECHNICAL FIELD

Embodiments of the present disclosure relate to a touch display panel, a manufacturing method thereof, a driving method thereof and a display device.

BACKGROUND

Many current smart mobile phones or intelligent wearable products have the function of near field communication (NFC) to communicate with an external device for identity authentication or payment. Two parts of hardware are needed for achieving the NFC function: an NFC antenna and an NFC chip.

Currently, devices having an NFC function mainly achieve the NFC function through an externally-expanded NFC antenna. For instance, in a smart mobile phone, an NFC antenna is usually placed on the back of the mobile phone shell or a battery terminal; and an intelligent-payment wearable product generally requires an external secure digital memory card (SDMC) or a subscriber identity module (SIM) provided with an NFC antenna. The external connection mechanism in the relevant technologies increases difficulty in the manufacturing process and production cost.

In addition, the NFC antenna in the relevant technologies can only be used for non-contact communication and cannot be used for achieving other functions, and hence is also limited in the aspect of function integration. Moreover, the development trend of smart devices is miniaturization. As for a wireless device, the design of antennas becomes a bottleneck because there is no sufficient space.

Therefore, the NFC antenna in the relevant technologies is disposed on the outside of the smart device, causing the assembly difficulty and the production cost to be increased; and as the NFC antenna in the relevant technologies only has a single function, the integration of the NFC antenna is relatively low and the product value is relatively low as well.

SUMMARY

Embodiments of the present disclosure provide a touch display panel, including: a display region which is provided with a touch circuit; and a non-display region which is provided with a near field communication (NFC) antenna circuit and a control circuit. The NFC antenna circuit includes at least one coil, a first connecting line connected with one end of the coil, and a second connecting line connected with another end of the coil; and the first connecting line and the second connecting line are connected with the control circuit, and the first connecting line and the second connecting line are connected or disconnected with each other under control of the control circuit.

Embodiments of the present disclosure provide a display device, comprising the above touch display panel.

Embodiments of the present disclosure provide a method for manufacturing a touch display panel, comprising:

forming, on a base substrate, at least one coil and a plurality of mutually-insulated driving electrodes and sensing electrodes in a same layer by a patterning process, wherein the driving electrodes and the sensing electrodes are formed in a predetermined display region, the coil is formed in a predetermined non-display region, and the driving electrodes or the sensing electrodes are discontinuously distributed;

forming, by a patterning process, an insulating layer on the base substrate provided with the coil, the driving electrodes and the sensing electrodes; and forming, on the insulating layer, at least one first connecting line, at least one second connecting line and a plurality of jumpers in a same layer by a patterning process, wherein each jumper is connected with two adjacent discontinuously-distributed driving electrodes or sensing electrodes, one end of the coil is electrically connected with a control circuit through the first connecting line, and another end of the coil is electrically connected with the control circuit through the second connecting line, the control circuit is configured to control connection or disconnection between the first connecting line and the second connecting line, and the first connecting line and the second connecting line are not intercrossed.

Embodiments of the present disclosure provide a driving method of a touch display panel, comprising:

outputting, by the control circuit, a first control signal to control operation of the touch circuit when the touch display panel implements a touch function; and outputting, by the control circuit, a second control signal to control the first connecting line to be connected with the second connecting line when the touch display panel implements an NFC function.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Embodiments of the present disclosure provide a touch display panel, a manufacturing method thereof, a driving method thereof and a display device, in which an NFC antenna is disposed inside the touch display panel, so that the production cost of the product can be reduced.

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Detailed description will be given below to the touch display panel provided by embodiments of the present disclosure with reference to the accompanying drawings.

Figure 1:
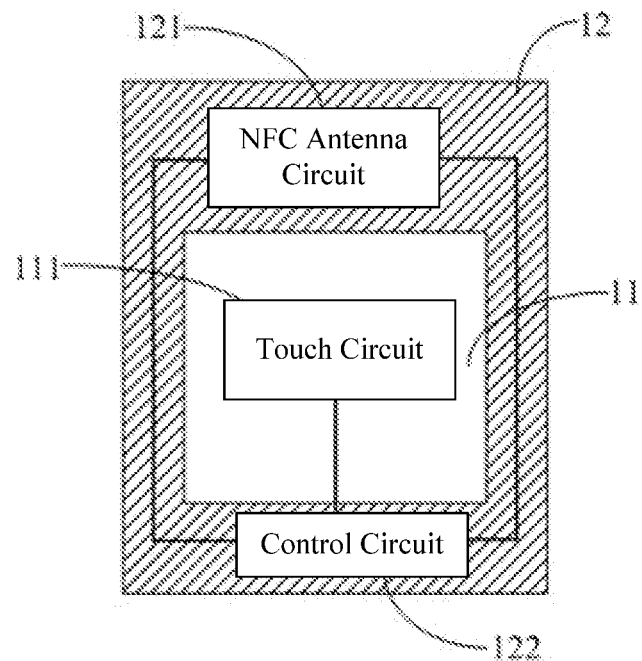
FIG. 1 is a block diagram of a touch display panel provided by an embodiment of the present disclosure.

As illustrated in FIG. 1, an embodiment of the present disclosure provides a touch display panel, which comprises a display region 11 and a non-display region 12. The display region 11 is provided with a touch circuit 111, and the non-display region 12 is provided with an NFC antenna circuit 121 and a control circuit 122.

Figure 2:
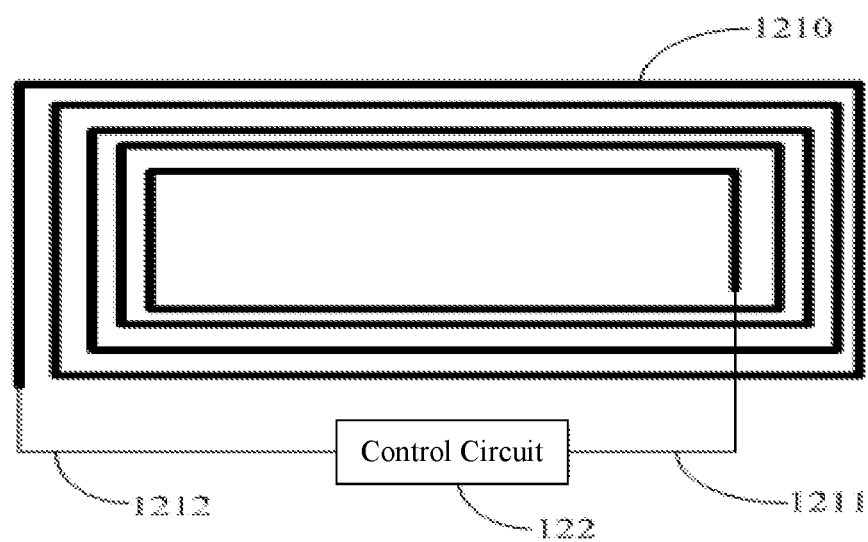
FIG. 2 is a schematic structural view of an NFC antenna circuit in an embodiment of the present disclosure.

The NFC antenna circuit 121 may include at least one coil 1210, a first connecting line 1211 connected with one end of the coil 1210, and a second connecting line 1212 connected with the other end of the coil 1210. As illustrated in FIG. 2, description is given in the embodiment by taking the case that the NFC antenna circuit 121 includes one coil 1210 as an example. Of course, the NFC antenna circuit 121 may also include a plurality of coils, a plurality of first connecting lines and a plurality of second connecting lines, where one end of each coil is connected to the control circuit through one first connecting line, and the other end of each coil is connected to the control circuit through one second connecting line. As illustrated in FIG. 2, the first connecting line 1211 and the second connecting line 1212 are respectively connected to the control circuit 122. The first connecting line 1211 and the second connecting line 1212 are connected or disconnected with each other under the control of the control circuit 122. For instance, the control circuit 122 may control the first connecting line 1211 to be connected to the second connecting line 1212, and may also control the first connecting line 1211 to be disconnected to the second connecting line 1212. When the first connecting line 1211 and the second connecting line 1212 are connected to each other under the control of the control circuit 122, the coil 1210 is a closed coil.

For instance, as the shape of a front face of the coil 1210 in the embodiment of the present disclosure is a rectangular fold line, the specific design is simple and convenient. The coil 1210 in the embodiment of the present disclosure may be made from metal or metal oxide conductive materials. For instance, the adopted conductive materials may be transparent conductive materials or opaque conductive materials. No limitation will be given to the material of the coil 1210 in the embodiments of the present disclosure.

In the embodiments of the present disclosure, the NFC antenna circuit is disposed in the non-display region of the touch display panel, which replaces a solution of placing the NFC externally in smart products in relevant technologies, that is, to replace the solution of adding an enamelled-wire coil on the back of a mobile phone shell or a battery in the relevant technologies. Thus, the production cost of the product can be reduced.

Figure 3:
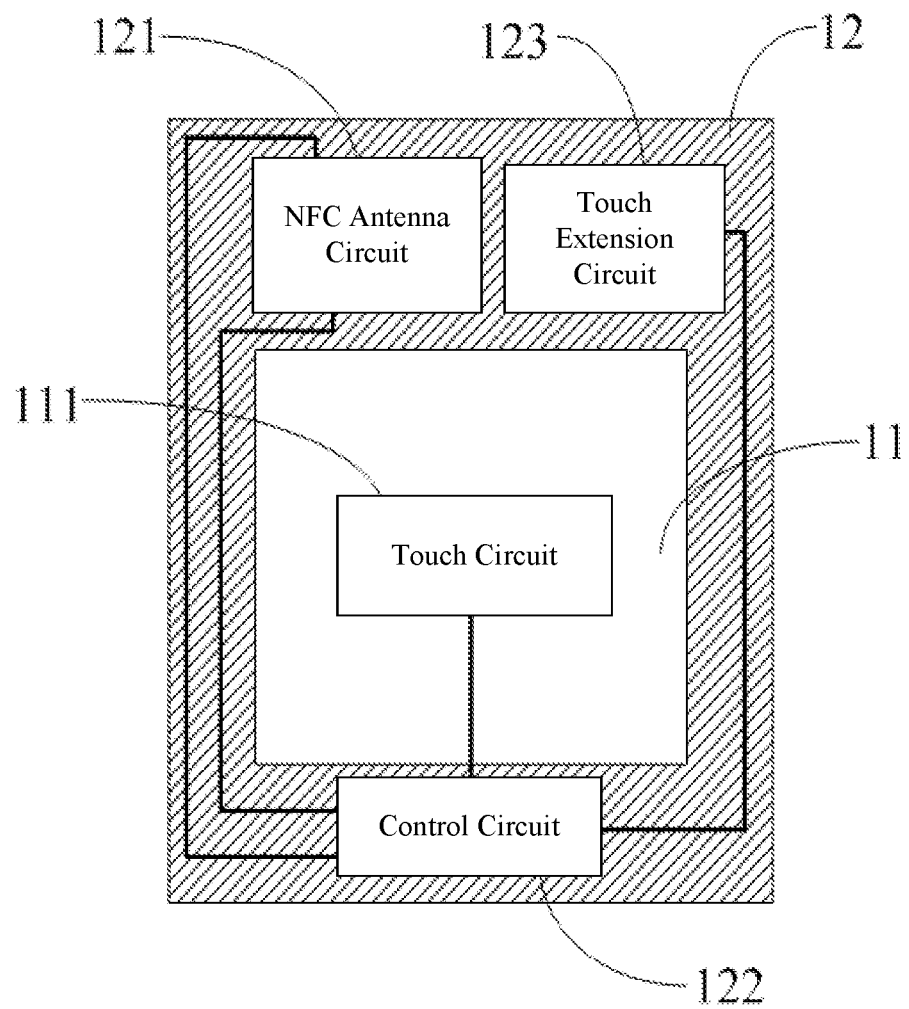
FIG. 3 is another block diagram of a touch display panel provided by an embodiment of the present disclosure.
Figure 4:
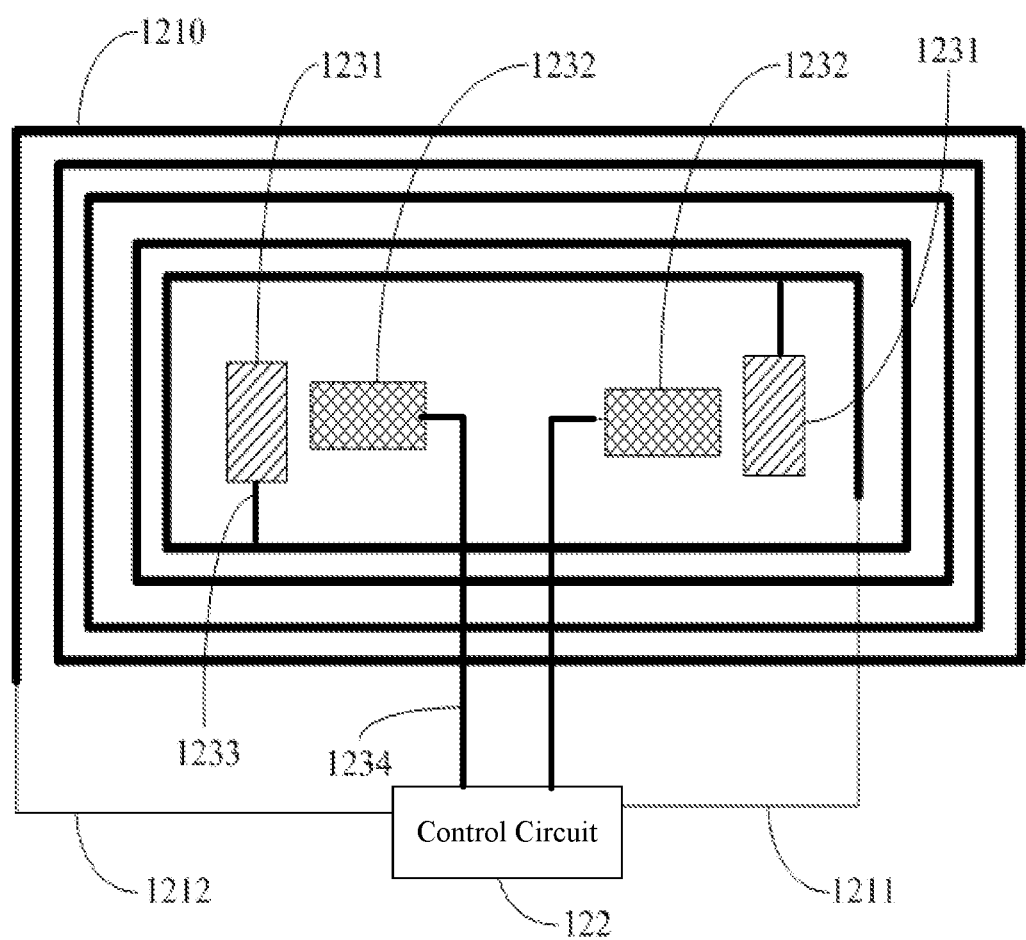
FIG. 4 is a schematic structural view of an NFC antenna circuit and a touch extension circuit in an embodiment of the present disclosure.

As illustrated in FIG. 3, the touch display panel provided by an embodiment of the present disclosure further comprises a touch extension circuit 123 disposed in the non-display region 12. The touch extension circuit 123 includes at least one sensing electrode piece 1231 (may also be referred to as an extension sensing electrode piece), at least one driving electrode piece 1232 (may also be referred to as an extension driving electrode piece), a third connecting line 1233 connected with the sensing electrode piece 1231, and a fourth connecting line 1234 connected with the driving electrode piece 1232. As illustrated in FIG. 4, description is given in the embodiments of the present disclosure by taking the case that the touch extension circuit 123 includes two sensing electrode pieces 1231, two driving electrode pieces 1232, two third connecting lines 1233 and two fourth connecting lines 1234 as an example.

As illustrated in FIG. 4, the sensing electrode pieces 1231 and the driving electrode pieces 1232 are arranged in the same layer, and the sensing electrode pieces 1231 are insulated from the driving electrode pieces 1232; each sensing electrode piece 1231 is electrically connected with the coil 1210 through one third connecting line 1233; each driving electrode piece 1232 is connected with the control circuit 122 through one fourth connecting line 1234; and the control circuit 122 is configured to control the operation of the driving electrode pieces 1232.

For instance, as illustrated in FIG. 4, the coil 1210 in the embodiment of the present disclosure and the sensing electrode pieces 1231 and the driving electrode pieces 1232 are arranged in the same layer and insulated from each other. Thus, in a specific manufacturing process, the coil 1210, the sensing electrode pieces 1231 and the driving electrode pieces 1232 disposed in the same layer may be simultaneously formed by one process, so that some steps in the product process can be reduced and the production cost can be reduced.

For instance, as illustrated in FIG. 4 in the embodiment of the present disclosure, the first connecting line 1211, the second connecting line 1212, the third connecting lines 1233 and the fourth connecting lines 1234 are arranged in the same layer and are not intercrossed with each other. Thus, in a specific manufacturing process, the first connecting line 1211, the second connecting line 1212, the third connecting lines 1233 and the fourth connecting lines 1234 disposed in the same layer may be simultaneously formed by one process, so that some steps in the product process can be reduced, and hence the production cost can be reduced.

In embodiments of the present disclosure, the touch extension circuit is disposed in the non-display region; a coupling capacitor is formed by utilization of the NFC antenna circuit and the touch extension circuit; and the touch application on the non-display region is achieved under the control of the control circuit. For instance, as for products such as smart mobile phones or smart watches, the touch extension circuit may be taken as extension buttons of a system in the case of application, and users can customize the buttons to rapidly start the functions, for instance, one button for switching on a camera and one button for mute. The control circuit in the embodiments of the present disclosure is integrated with a touch chip for controlling the operation of the touch circuit and the touch extension circuit, and an NFC chip for controlling the operation of the NFC antenna circuit, etc.

Figure 5:
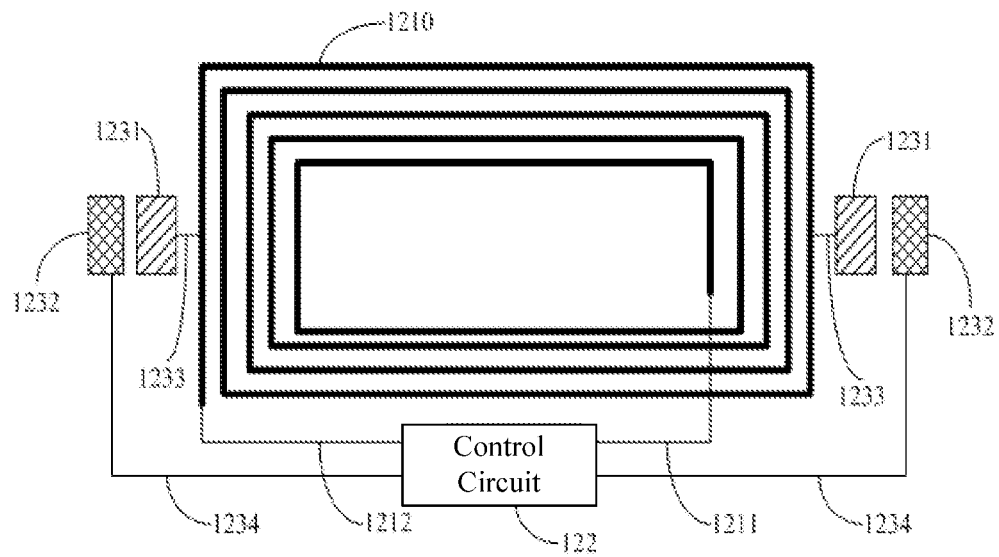
FIG. 5 is another schematic structural view of an NFC antenna circuit and a touch extension circuit in an embodiment of the present disclosure.
Figure 6:
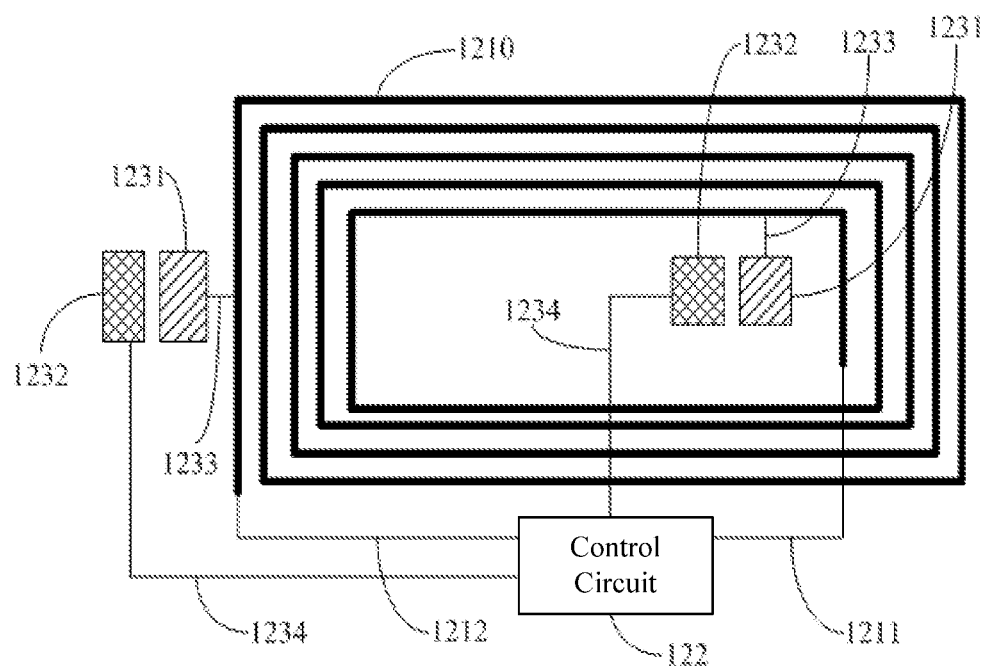
FIG. 6 is yet another schematic structural view of an NFC antenna circuit and a touch extension circuit in an embodiment of the present disclosure.

As illustrated in FIG. 4, in the embodiment of the present disclosure, the sensing electrode pieces 1231 and the driving electrode pieces 1232 are disposed inside the coil 1210. Or, the sensing electrode pieces 1231 and the driving electrode pieces 1232 in an embodiment of the present disclosure may be disposed on the outside of the coil 1210, as shown in FIG. 5. Of course, in an embodiment of the present disclosure, part of the sensing electrode pieces 1231 and part of the driving electrode pieces 1232 may be disposed inside the coil 1210, and the remaining sensing electrode pieces 1231 and the remaining driving electrode pieces 1232 are disposed on the outside of the coil 1210, as shown in FIG. 6. In the embodiments of the present disclosure, when the sensing electrode pieces 1231 and the driving electrode pieces 1232 are disposed on the outside of the coil 1210, the interference of magnetic flux inside the coil 1210 can be avoided.

Figure 7:
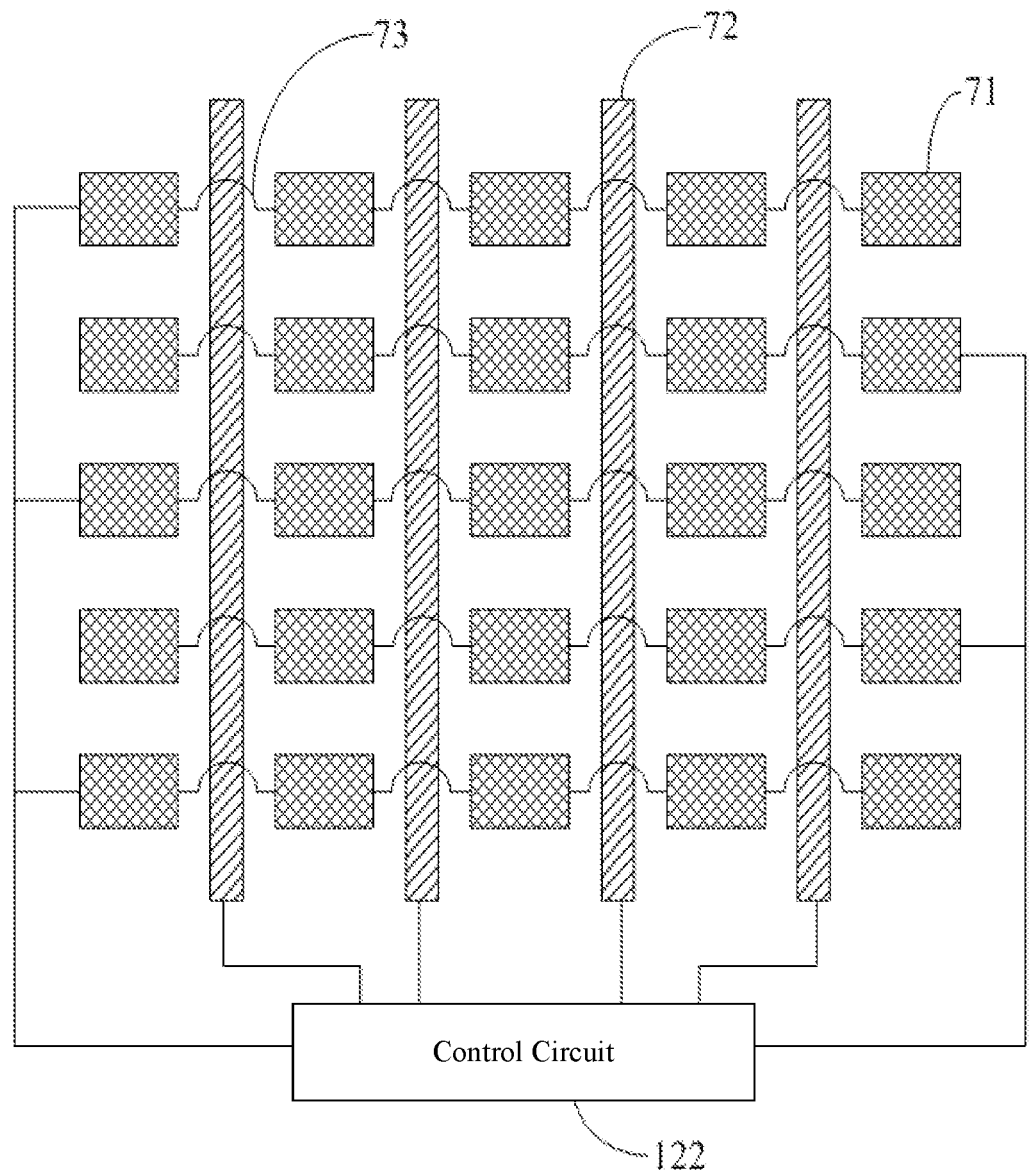
FIG. 7 is a structural diagram of a touch circuit in an embodiment of the present disclosure.

As illustrated in FIG. 7, the touch circuit 111 may include a plurality of driving electrodes 71 and a plurality of sensing electrodes 72 which are arranged in the same layer and insulated from each other, and a plurality of jumpers 73 disposed on the driving electrodes 71 or the sensing electrodes 72; the driving electrodes 71 or the sensing electrodes 72 are discontinuously distributed; and a jumper 73 is connected with two adjacent discontinuously-distributed driving electrodes 71 or two adjacent discontinuously-distributed sensing electrodes 72. Description is given in the embodiments of the present disclosure by taking the case that the driving electrodes 71 are discontinuously distributed and each jumper 73 is connected with two adjacent discontinuously-distributed driving electrodes 71 as an example.

For instance, as illustrated in FIGS. 6 and 7, in embodiments of the present disclosure, the coil 1210, the sensing electrode pieces 1231 and the driving electrode pieces 1232 are arranged in the same layer with the driving electrodes 71 and the sensing electrodes 72. Thus, in a specific manufacturing process, the coil 1210, the sensing electrode pieces 1231, the driving electrode pieces 1232, the driving electrodes 71 and the sensing electrodes 72 disposed in the same layer may be simultaneously formed by one process, so that steps in the product process can be reduced, and hence the production cost can be reduced.

For instance, as illustrated in FIGS. 6 and 7, in the embodiments of the present disclosure, the first connecting line 1211, the second connecting line 1212, the third connecting lines 1233 and the fourth connecting lines 1234 are arranged in the same layer with the jumpers 73. Thus, in a specific manufacturing process, the first connecting line 1211, the second connecting line 1212, the third connecting lines 1233, the fourth connecting lines 1234 and the jumpers 73 disposed in the same layer may be simultaneously formed by one process, so that steps in the product process can be reduced, and hence the production cost can be reduced. For instance, the first connecting line 1211, the second connecting line 1212, the third connecting lines 1233 and the fourth connecting lines 1234 are not intercrossed with each other in the same layer.

For instance, as illustrated in FIG. 2 in the embodiment of the present disclosure, the NFC antenna circuit 121 and the touch extension circuit 123 are disposed on a top portion of the non-display region 12. Of course, in an actual design process, in the embodiments of the present disclosure, the NFC antenna circuit 121 and the touch extension circuit 123 may also be disposed in other areas of the non-display region 12.

For instance, in the embodiments of the present disclosure, the NFC antenna circuit and the touch extension circuit may also be disposed on a bottom portion of the non-display region. Of course, when it is feasible in an actual condition, the NFC antenna circuit and the touch extension circuit may also be disposed at a lateral area of the non-display region in the embodiments of the present disclosure.

The embodiments of the present disclosure further provide a display device, which comprises the foregoing touch display panel. The display device may be a liquid crystal display (LCD) panel, an LCD device, an LCD TV, an organic light-emitting diode (OLED) panel, an OLED display device, an OLED TV, and an e-paper, etc.

Figure 8:
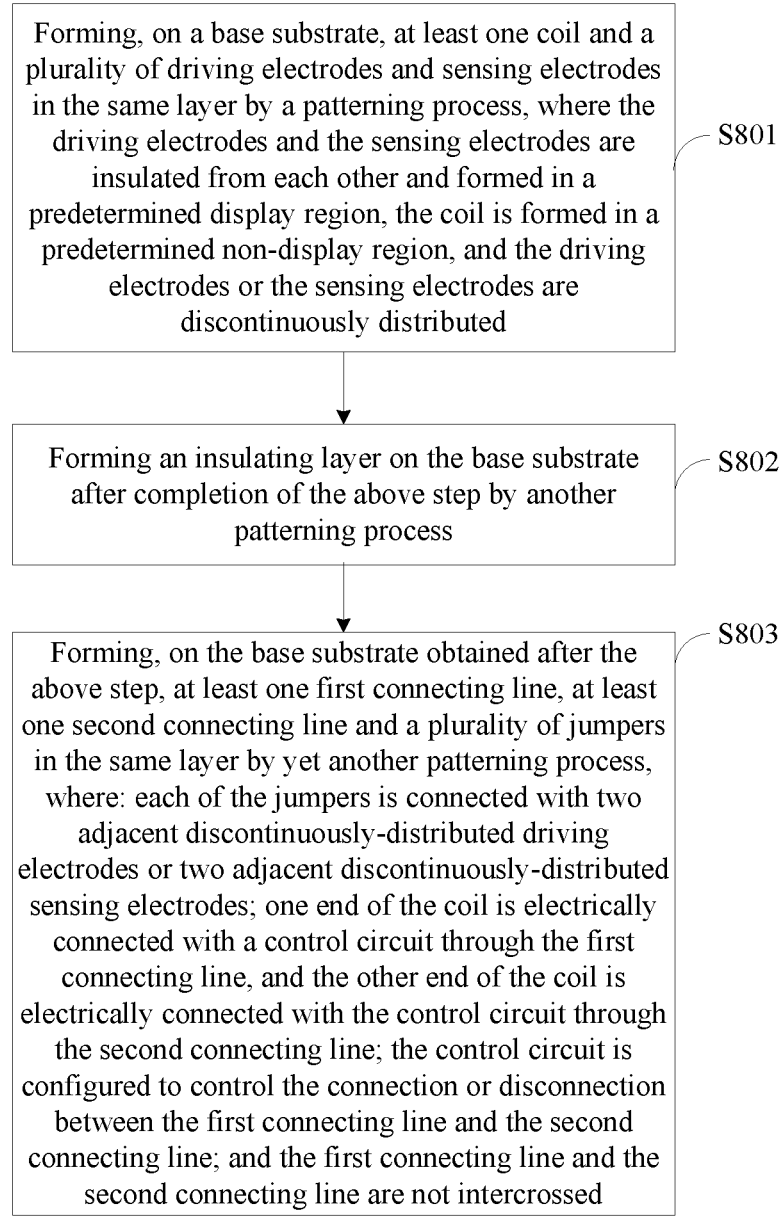
FIG. 8 is a flowchart of a method for manufacturing a touch display panel provided by an embodiment of the present disclosure.

As illustrated in FIG. 8, the embodiments of the present disclosure further provide a method for manufacturing a touch display panel. The method comprises:

S801: forming, on a base substrate, at least one coil and a plurality of driving electrodes and sensing electrodes in the same layer by a patterning process, where the driving electrodes and the sensing electrodes are insulated from each other and formed in a predetermined display region, the coil is formed in a predetermined non-display region, and the driving electrodes or the sensing electrodes are discontinuously distributed.

S802: forming an insulating layer on the base substrate after completion of the above step by another patterning process (for instance, forming an insulating layer on the base substrate that is already provided with the coil, the driving electrodes and the sensing electrodes by the patterning process).

S803: forming, on the base substrate obtained after the above step, at least one first connecting line, at least one second connecting line and a plurality of jumpers in the same layer by yet another patterning process (for instance, forming, on the insulating layer, at least one first connecting line and at least one second connecting line in the same layer by a patterning process). Each of the jumpers is connected with two adjacent discontinuously-distributed driving electrodes or two adjacent discontinuously-distributed sensing electrodes; one end of the coil is electrically connected with a control circuit through the first connecting line, and the other end of the coil is electrically connected with the control circuit through the second connecting line; the control circuit is configured to control the connection or disconnection between the first connecting line and the second connecting line; and the first connecting line and the second connecting line are not intercrossed.

In the step S803, the number of the first connecting lines is equal to the number of the coils; that is, the first connecting lines and the coils are in one-to-one correspondence. The number of the second connecting lines is also equal to the number of the coils; that is, the second connecting lines and the coils are in one-to-one correspondence.

In the embodiments of the present disclosure, the driving electrodes, the sensing electrodes and the coils are formed on the base substrate in the same layer by a patterning process. The patterning process in the embodiments of the present disclosure includes partial or all the processes of photoresist coating, exposure, development, etching and photoresist removal.

Detailed description is given in the embodiments of the present disclosure by taking the case that the driving electrodes, the sensing electrodes and the coil are made from metallic materials as an example. Firstly, one layer of metallic film is deposited on the base substrate. Secondly, photoresist is coated on the deposited metallic film. Thirdly, only photoresist at positions where the coil, the driving electrodes and the sensing electrodes are to be formed is retained after exposure and development, and photoresist at the other positions is removed. Fourthly, the metallic film not covered by the photoresist is removed by etching. Finally, the remaining photoresist is removed, and the at least one coil and the plurality of mutually-insulated driving electrodes and sensing electrodes are formed. The pattern design of forming the driving electrodes and the sensing electrodes in the embodiments of the present disclosure may be the same with or similar to the relevant prior art. The pattern design of forming the coil in the embodiments of the present disclosure may be referred to in the shape design of the coil as shown in FIG. 2.

The specific method of forming the insulating layer by the patterning process in the embodiments of the present disclosure is the same with or similar to the relevant prior art. No further description will be given here. The insulating layer formed in the embodiments of the present disclosure may be a single-layer film of SiO2 or SiN or a composite film of SiO2 and SiN. No specific limitation will be given to the material of the formed insulating layer in the embodiments of the present disclosure.

The process of forming the at least one first connecting line, the at least one second connecting line and the plurality of jumpers in the same layer by a patterning process in the embodiments of the present disclosure is similar to the process of forming the driving electrodes, the sensing electrodes and the coil on the base substrate in the same layer by a patterning process in the embodiments of the present disclosure. No further description will be given here.

Figure 9:
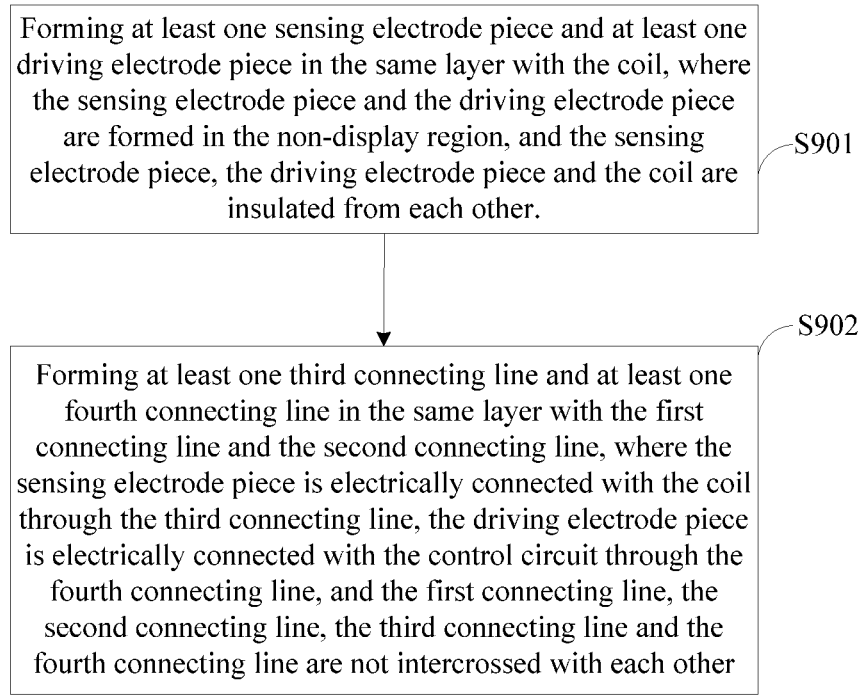
FIG. 9 is another flowchart of a method for manufacturing a touch display panel provided by an embodiment of the present disclosure.

For instance, as illustrated in FIG. 9, the method for manufacturing the touch display panel provided by an embodiment of the present disclosure further comprises:

S901: forming at least one sensing electrode piece and at least one driving electrode piece in the same layer with the coil, where the sensing electrode piece and the driving electrode piece are formed in the non-display region, and the sensing electrode piece, the driving electrode piece and the coil are insulated from each other.

S902: forming at least one third connecting line and at least one fourth connecting line in the same layer with the first connecting line and the second connecting line, where the sensing electrode piece is electrically connected with the coil through the third connecting line, the driving electrode piece is electrically connected with the control circuit through the fourth connecting line, and the first connecting line, the second connecting line, the third connecting line and the fourth connecting line are not intercrossed with each other.

For instance, in the step S902, the number of the formed third connecting lines is equal to the number of the formed sensing electrode pieces; that is, the third connecting lines and the sensing electrode pieces are in one-to-one correspondence. The number of the formed fourth connecting lines is also equal to the number of the formed driving electrode pieces; that is, the fourth connecting lines and the driving electrode pieces are in one-to-one correspondence.

Detailed description is given in the embodiments of the present disclosure by taking the case that the driving electrodes, the sensing electrodes, the coil, the sensing electrode piece and the driving electrode piece are made from metallic materials as an example. Firstly, one layer of metallic film is deposited on the base substrate. Secondly, photoresist is coated on the deposited metallic film. Thirdly, only photoresist at positions where the coil, the sensing electrode piece, the driving electrode piece, the driving electrodes and the sensing electrodes are to be formed is retained after exposure and development of the photoresist, and photoresist at the other positions is removed. Fourthly, the metallic film not covered by the photoresist is removed by etching. Finally, the remaining photoresist is removed, and the at least one coil, the at least one sensing electrode piece, the at least one driving electrode piece and the plurality of driving electrodes and sensing electrodes are formed.

For instance, the step of forming the at least one sensing electrode piece and the at least one driving electrode piece in the same layer with the coil in the embodiments of the present disclosure includes:

forming the at least one sensing electrode piece and the at least one driving electrode piece in the same layer with the coil inside the coil, as shown in FIG. 4; or forming the at least one sensing electrode piece and the at least one driving electrode piece in the same layer with the coil on the outside of the coil, as shown in FIG. 5; or forming at least one sensing electrode piece and at least one driving electrode piece in the same layer with the coil inside the coil, and forming at least one sensing electrode piece and at least one driving electrode piece in the same layer with the coil on the outside of the coil, as shown in FIG. 6.

The pattern design of forming the coil, the driving electrode piece and the sensing electrode piece in the non-display region in the embodiments of the present disclosure may be referred to in FIG. 4.

In the embodiments of the present disclosure, the first connecting line, the second connecting line, the third connecting line, the fourth connecting line and the jumpers arranged in the same layer and insulated from each other are formed by one patterning process. The process of simultaneously forming the first connecting line, the second connecting line, the third connecting line, the fourth connecting line and the jumpers in the embodiments of the present disclosure is similar to the process of simultaneously forming the coil, the sensing electrode piece, the driving electrode piece, the driving electrodes and the sensing electrodes. No further description will be given here.

In the embodiments of the present disclosure, the touch circuit, the NFC antenna circuit and the touch extension circuit are simultaneously formed in the display region and the non-display region of the touch display panel respectively, so that steps in the production process can be reduced, and hence the production cost of the product can be reduced.

The embodiments of the present disclosure further provide a driving method of a touch display panel. The driving method comprises:

outputting, by a control circuit, a first control signal to control operation of a touch circuit when the touch display panel implements a touch function; and outputting, by the control circuit, a second control signal to control a first connecting line to be connected with a second connecting line when the touch display panel implements an NFC function.

In relevant prior art, an integrated touch display panel achieves touch and display functions by time-sharing driving, that is, achieving the touch function in the touch period and achieving the display function in the display period.

A touch non-contact communication panel provided by the embodiments of the present disclosure is completed under a one glass solution (OGS) process, and the manufacturing processes of a non-contact NFC antenna and an OGS touch circuit are completely compatible. In the design solution of this type of panels, the touch circuit and the NFC antenna belong to a common-channel multiplexing and achieve the common-channel multiplexing by time-sharing driving.

For instance, when the touch display panel provided by an embodiment of the present disclosure needs to achieve the touch function, the control circuit outputs the first control signal to control the operation of the touch circuit. At this point, the touch circuit operates in the touch period of the touch display panel. The specific process of achieving the touch function by the operation of the touch circuit is the same with or similar to the relevant prior art. No further description will be given here. Meanwhile, the control circuit controls the first connecting line to be disconnected with the second connecting line. As the first connecting line and the second connecting line are disconnected at this point, the NFC antenna circuit in the embodiment of the present disclosure does not operate.

When the touch display panel provided by an embodiment of the present disclosure needs to achieve the NFC function, the control circuit outputs the second control signal to control the first connecting line to be connected to the second connecting line. After the connection between the first connecting line and the second connecting line is established, the NFC antenna circuit forms a closed loop. An induced current loop is formed in the NFC antenna circuit by an external magnetic induction coil, and hence near field communication can be achieved.

As the touch circuit in the embodiments of the present disclosure is disposed in the display region and the NFC antenna circuit is disposed in the non-display region, the touch display panel provided by the embodiments of the present disclosure can simultaneously achieve the touch function and the NFC function.

For instance, the driving method of the touch display panel provided by the embodiments of the present disclosure further comprises:

outputting, by the control circuit, a third control signal to control the touch extension circuit to operate and to control the first connecting line to be disconnected with the second connecting line when the touch display panel implements the touch function; and outputting, by the control circuit, a fourth control signal to control the first connecting line to be connected with the second connecting line and to control the operation of the touch extension circuit to be stopped when the touch display panel implements the NFC function.

For instance, when the touch display panel provided by the embodiments of the present disclosure needs to achieve the touch function, the third control signal outputted by the control circuit in the embodiments of the present disclosure controls the touch extension circuit to operate and controls the first connecting line to be disconnected with the second connecting line. As the control circuit 122 outputs the third control signal to control the first connecting line 1211 to be disconnected with the second connecting line 1212, as illustrated in FIG. 4, the NFC antenna circuit at this point (for instance, including the coil 1210) is actually a touch sensing circuit, and the sensing electrode pieces 1231 are connected with the NFC antenna circuit. In this case, when the control circuit 122 outputs touch driving signals to the driving electrode pieces 1232, a capacitive coupling unit is formed by each sensing electrode piece 1231 and a corresponding driving electrode piece 1232. As shown in FIG. 4, two capacitive coupling units are respectively formed by two sensing electrode pieces 1231 and two corresponding driving electrode pieces 1232.

When a finger touches the formed two capacitive coupling units, the mutual-capacitance induction at the touch position can change, and the touch position can be detected via the control circuit. The method of detecting the touch position via the control circuit in the embodiments of the present disclosure is the same with the method of detecting the touch position of the touch circuit in relevant prior art. No further description will be given here. For instance, in the embodiments of the present disclosure, when the control circuit outputs the third control signal, the first connecting line 1211 is floating and the second connecting line 1212 receives a low level signal.

For instance, when the touch display panel provided by the embodiments of the present disclosure needs to achieve the NFC function, the control circuit outputs the fourth control signal to control the first connecting line to be connected with the second connecting line and to control the touch extension circuit to stop operation. After the connection between the first connecting line and the second connecting line is established, the NFC antenna circuit forms a closed loop. An induction current loop may be formed in the NFC antenna circuit through an external magnetic induction coil, and hence NFC can be achieved.

In the embodiments of the present disclosure, the NFC antenna circuit and the touch extension circuit are formed in a non-display region of an intelligent terminal. Coupling is formed by utilization of the NFC antenna circuit and the touch extension circuit, so that the NFC antenna circuit can achieve two functions including an NFC non-contact card read and a non-display region extension application.

In summary, the embodiments of the present disclosure provide a touch display panel, which comprises a display region and a non-display region, where: the display region is provided with a touch circuit; the non-display region is provided with an NFC antenna circuit and a control circuit; the NFC antenna circuit includes at least one coil, a first connecting line connected with one end of the coil, and a second connecting line connected with the other end of the coil; and the first connecting line and the second connecting line are connected with the control circuit and are connected or disconnected with each other under the control of the control circuit. The NFC antenna circuit is disposed in the non-display region of the touch display panel in the embodiments of the present disclosure, which replaces the solution of placing NFC externally in smart products in relevant prior art, that is, replacing the solution of adding an NFC antenna on the back of a mobile phone shell or a battery in relevant prior art. Thus, the production cost of the product can be reduced.

It should be noted that, in the drawings, the size of a layer or an area may be exaggerated for clarity of the drawings. Besides, it is understandable that if an element or a layer is said to be "under" another element or layer, it can be directly under the other element or an intermediate layer may exist therebetween. Besides, it is understandable that if a layer or an element is said to be "between" two layers or "between" two elements, it can be the only one layer or element between the two layers or two elements, or one or more intermediate layer or element can exist. Similar reference marks in the full text refer to the similar elements.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

It is noted that, azimuth or positional relationships indicated by terms such as "up" and "down" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

The foregoing are merely specific embodiments of the disclosure, but not limitative to the protection scope of the disclosure. One skilled in the art could devise variations or replacements that within the scope and the spirit of the present disclosure, those variations or replacements shall belong to the protection scope of the disclosure. Thus, the protection scope of the disclosure shall be defined by the accompanying claims.

The present disclosure claims the benefits of Chinese patent application No. 201510670760.8, which was filed on Oct. 13, 2015 and is incorporated herein in its entirety by reference as part of this application.

What is claimed is:

1. A touch display panel, comprising:
   a display region which is provided with a touch circuit; and
   a non-display region which is provided with a near field communication (NFC) antenna circuit and a control circuit; wherein:
   the NFC antenna circuit includes at least one coil, a first connecting line connected with one end of the coil and a second connecting line connected with another end of the coil; and
   the first connecting line and the second connecting line are connected with the control circuit, and the first connecting line and the second connecting line are connected or disconnected with each other under control of the control circuit,
   the touch display panel further comprises a touch extension circuit disposed in the non-display region, wherein:
   the touch extension circuit includes at least one sensing electrode piece, at least one driving electrode piece, a third connecting line connected with the sensing electrode piece, and a fourth connecting line connected with the driving electrode piece;
   the sensing electrode piece and the driving electrode piece are arranged in a same first layer and insulated from each other, the sensing electrode piece is electrically connected with the coil through the third connecting line, the driving electrode piece is connected with the control circuit through the fourth connecting line, and the control circuit is configured to control operation of the driving electrode piece.

2. The touch display panel according to claim 1, wherein the coil, the sensing electrode piece and the driving electrode piece are arranged in the same first layer and insulated from each other.

3. The touch display panel according to claim 2, wherein the first connecting line, the second connecting line, the third connecting line and the fourth connecting line are arranged in a same second layer and are not intercrossed with each other.

4. The touch display panel according to claim 3, wherein:
   the sensing electrode piece and the driving electrode piece are disposed inside the coil; or
   the sensing electrode piece and the driving electrode piece are disposed outside the coil.

5. The touch display panel according to claim 4, wherein:
   the touch circuit includes a plurality of driving electrodes and a plurality of sensing electrodes which are arranged in the same first layer and insulated from each other, and the touch circuit further includes a plurality of jumpers disposed on the driving electrodes or the sensing electrodes;
   the driving electrodes or the sensing electrodes are discontinuously distributed, each of the jumpers is connected with two adjacent discontinuously-distributed driving electrodes or sensing electrodes; and
   the coil, the sensing electrode piece and the driving electrode piece are arranged in the same first layer with the driving electrodes and the sensing electrodes.

6. The touch display panel according to claim 5, wherein the first connecting line, the second connecting line, the third connecting line and the fourth connecting line are arranged in the same second layer with the jumpers.

7. The touch display panel according to claim 6, wherein a shape of a front face of the coil is a rectangular fold line.

8. The touch display panel according to claim 7, wherein:
   the NFC antenna circuit and the touch extension circuit are disposed on a top portion of the non-display region; or
   the NFC antenna circuit and the touch extension circuit are disposed on a bottom portion of the non-display region.

9. The touch display panel according to claim 1, wherein:
   the touch extension circuit includes a plurality of sensing electrode pieces and a plurality of driving electrode pieces; and
   part of the sensing electrode pieces and part of the driving electrode pieces are disposed inside the coil, and a remaining part of sensing electrode pieces and a remaining part of the driving electrode pieces are disposed outside the coil.

10. A display device, comprising the touch display panel according to claim 1.

11. A driving method of a touch display panel according to claim 1, comprising:
    outputting, by the control circuit, a first control signal to control operation of the touch circuit when the touch display panel implements a touch function; and
    outputting, by the control circuit, a second control signal to control the first connecting line to be connected with the second connecting line when the touch display panel implements an NFC function.

12. The method according to claim 11, further comprising:
    outputting, by the control circuit, a third control signal to control operation of the touch extension circuit and to control the first connecting line to be disconnected with the second connecting line when the touch display panel implements the touch function; and outputting, by the control circuit, a fourth control signal to control the first connecting line to be connected with the second connecting line and to control the touch extension circuit to stop operation when the touch display panel implements the NFC function.

13. The method according to claim 12, wherein when the control circuit outputs the third control signal, the first connecting line is floating and the second connecting line receives a low-level signal.

14. A method for manufacturing a touch display panel, comprising:

forming, on a base substrate, at least one coil and a plurality of mutually-insulated driving electrodes and sensing electrodes in a same first layer by a first patterning process, wherein the driving electrodes and the sensing electrodes are formed in a predetermined display region, the coil is formed in a predetermined non-display region, and the driving electrodes or the sensing electrodes are discontinuously distributed;

forming, by a second patterning process, an insulating layer on the base substrate provided with the coil, the driving electrodes and the sensing electrodes; and forming, on the insulating layer, at least one first connecting line, at least one second connecting line and a plurality of jumpers in a same second layer by a third patterning process, wherein each jumper is connected with two adjacent discontinuously-distributed driving electrodes or sensing electrodes, one end of the coil is electrically connected with a control circuit through the first connecting line, and another end of the coil is electrically connect with the control circuit through the second connecting line, the control circuit is configured to control connection or disconnection between the first connecting line and the second connecting line, and the first connecting line and the second connecting line are not intercrossed, the method further comprising:

forming at least one sensing electrode piece and at least one driving electrode piece in the same first layer with the coil, wherein the sensing electrode piece and the driving electrode piece are formed in the non-display region, and the sensing electrode piece, the driving electrode piece and the coil are insulated from each other; and forming at least one third connecting line and at least one fourth connecting line in the same second layer with the first connecting line and the second connecting line, wherein the sensing electrode piece is electrically connected with the coil through the third connecting line, the driving electrode piece is electrically connected with the control circuit through the fourth connecting line, and the first connecting line, the second connecting line, the third connecting line and the fourth connecting line are not intercrossed with each other.

15. The method according to claim 14, wherein forming the at least one sensing electrode piece and the at least one driving electrode piece in the same first layer with the coil includes:

forming the at least one sensing electrode piece and the at least one driving electrode piece in the same first layer with the coil inside the coil; or forming the at least one sensing electrode piece and the at least one driving electrode piece in the same first layer with the coil on an outside of the coil.

* * * * *